US007805326B2

(12) United States Patent
Scheuer

(10) Patent No.: US 7,805,326 B2
(45) Date of Patent: Sep. 28, 2010

(54) SYSTEM TO RESOLVE SCHEDULING CONSTRAINTS

(75) Inventor: Tobias Scheuer, Bruchsal (DE)

(73) Assignee: SAP AG, Walldorf (DE)

( * ) Notice: Subject to any disclaimer, the term of this patent is extended or adjusted under 35 U.S.C. 154(b) by 552 days.

(21) Appl. No.: 11/645,469

(22) Filed: Dec. 26, 2006

(65) Prior Publication Data

US 2008/0115142 A1 May 15, 2008

Related U.S. Application Data

(60) Provisional application No. 60/865,993, filed on Nov. 15, 2006.

(51) Int. Cl.
*G06F 9/46* (2006.01)
(52) U.S. Cl. .......................................................... 705/8
(58) Field of Classification Search ...................... 705/8, 705/9
See application file for complete search history.

(56) References Cited

U.S. PATENT DOCUMENTS

| 5,040,123 | A | * | 8/1991 | Barber et al. | ............... | 700/100 |
| 5,233,533 | A | * | 8/1993 | Edstrom et al. | ............. | 700/103 |
| 5,630,070 | A | * | 5/1997 | Dietrich et al. | ................ | 705/8 |
| 5,826,080 | A | * | 10/1998 | Dworzecki | .................. | 718/103 |
| 6,216,109 | B1 | * | 4/2001 | Zweben et al. | ................. | 705/8 |
| 6,263,358 | B1 | * | 7/2001 | Lee et al. | .................... | 718/100 |
| 7,151,973 | B1 | * | 12/2006 | Moll | ......................... | 700/100 |

OTHER PUBLICATIONS

Roman Barták ("Constraint-Based Scheduling: An Introduction for Newcomers" Proceedings of 7th IFAC Workshop on Intelligent Manufacturing Systems (IMS 2003), Elsevier Science, 2003).*
Roman Barták ("Dynamic Constraint Models for Planning and Scheduling Problems" in K.R. Apt et al. (Eds.): New Trends in Constraints, LNAI 1865, pp. 237-255, 2000. Springer-Verlag Berlin Heidelberg 2000).*
Philippe Laborie ("Algorithms for propagating resource constraints in AI planning and scheduling: Existing approaches and new results," Artificial Intelligence 143 (2003) pp. 151-188, Elsevier Science).*

(Continued)

*Primary Examiner*—Romain Jeanty
*Assistant Examiner*—George H Walker
(74) *Attorney, Agent, or Firm*—Buckley, Maschoff & Talwalkar LLC

(57) ABSTRACT

A system may associate a first activity of a group of activities with a first resource, a first start time on the first resource, and a first end time on the first resource, associate a second activity of the group of activities with a second resource, a second start time on the second resource, and a second end time on the second resource, and resolve a maximum constraint of the first activity and a maximum constraint of the second activity after the association of the first activity with the first resource and the association of the second activity with the second resource. Further aspects may include determination of one or more maximum constraints of the first activity, determination of one or more maximum constraints of the second activity, and determination that at least one of the one or more maximum constraints of the first activity and the one or more maximum constraints of the second activity should be resolved after the association of the first activity with the first resource and before the association of the second activity with the second resource.

20 Claims, 7 Drawing Sheets

FIG. 6

OTHER PUBLICATIONS

Philippe Laborie ("Algorithms for propagating resource constraints in AI planning and scheduling: Existing approaches and new results," Artificial Intelligence vol. 143, Issue 2, Feb. 2003, pp. 151-188, ISSN 0004-3702, DOI: 10.1016/S0004-3702(02)00362-4).*

Roman Barták ("Constraint-Based Scheduling: An Introduction for Newcomers" Proceedings of 7th IFAC Workshop on Intelligent Manufacturing Systems (IMS 2003), Elsevier Science, 2003, ISBN 0080442897, 9780080442891).*

* cited by examiner

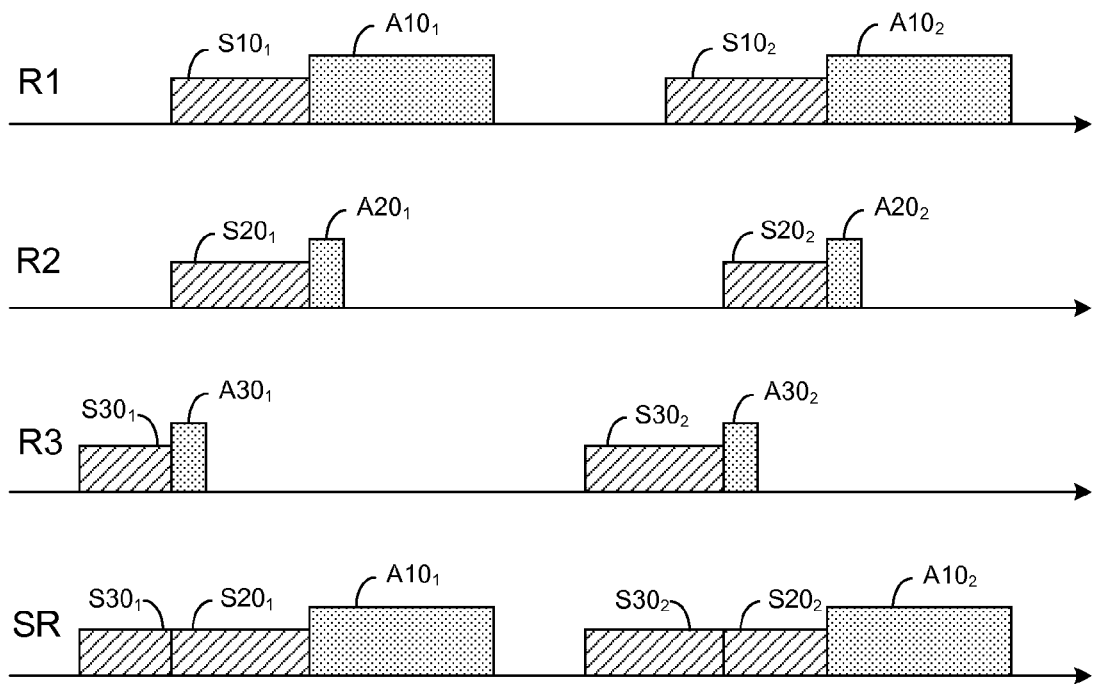
"Prior Art"  FIG. 1A
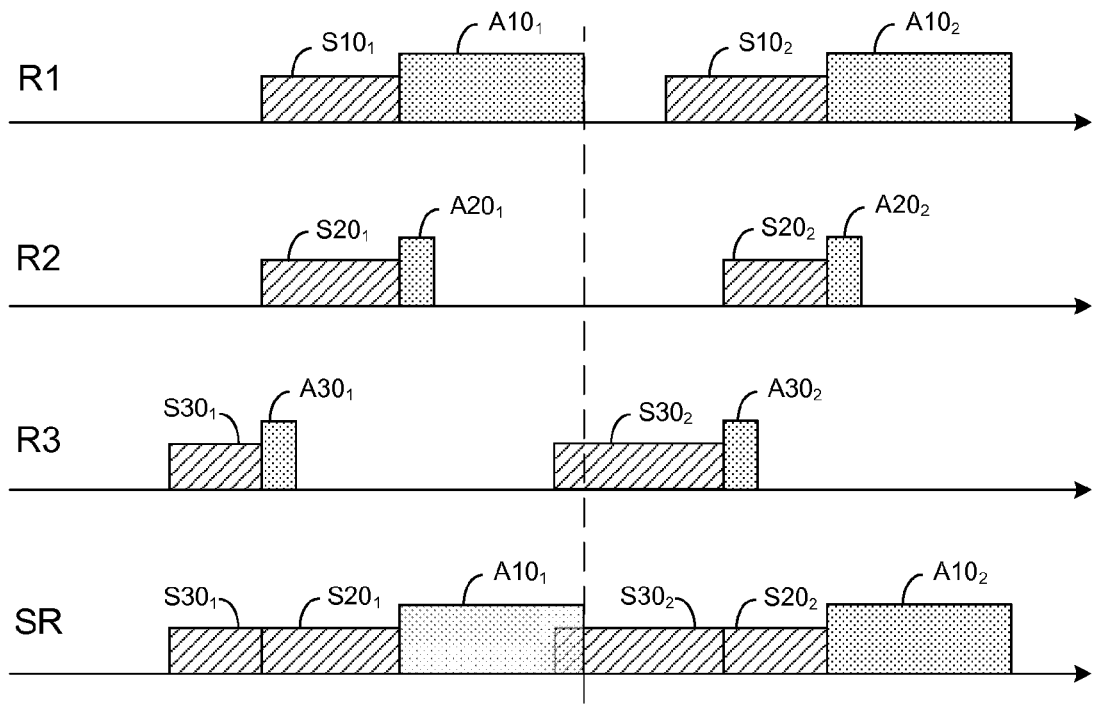
"Prior Art"  FIG. 1B

Order 1

Activity 1 min_const = 10:00
max_const = 11:00
duration = 1hr
resource = R_1

Activity 2 min_const = after Activity 1 End Time
max_const = 1s after Activity 1 completes
duration = .5hr
resource = R_1

FIG. 4

Start Time: 10:00
End Time: 11:00

Start Time: 10:00          Start Time: 12:00
End Time: 11:00            End Time: 12:30

Start Time: 10:00          Start Time: 11:00
End Time: 11:00            End Time: 11:30

SYSTEM TO RESOLVE SCHEDULING CONSTRAINTS

CROSS-REFERENCE TO RELATED APPLICATIONS

The present application claims priority to U.S. Provisional Patent Application Ser. No. 60/865,993, filed on Nov. 15, 2006 and entitled "System to Resolve Scheduling Constraints".

FIELD

Some embodiments relate to systems for scheduling an activity on a resource. In particular, some embodiments are associated with systems to schedule multiple activities on one or more resources in compliance with scheduling constraints of the activities.

BACKGROUND

According to some business data models, an order consists of several activities which must be performed to complete, fulfill, and/or satisfy the order. Scheduling applications may be used to schedule the performance of the activities of an order.

An activity may be scheduled by "placing" the activity on a resource that is capable of executing the activity. Placing the activity may consist of assigning the activity to the resource in association with a defined start time, a defined duration and a defined end time. The placed activity is therefore intended to consume some of the capacity offered by the resource between the start time and the end time.

The placed activity may consume the capacity of another resource during the same time interval. Such capacity is known as a secondary capacity requirement of the activity. Some activities are sequence-dependent, in that their duration depends on the preceding activity on the same resource. Accordingly, the duration, and hence the start time or end time, of a sequence-dependent activity may change during the scheduling process.

The foregoing elements may complicate the scheduling (or rescheduling) of orders and their constituent activities. For example, the activities of an order might be moved to fall in a time slot where required resource capacity is available. An unmoved sequence-dependent activity may increase in duration if one of the moved activities is on the same resource as the sequence-dependent activity. Accordingly, the sequence-dependent activity may overlap the moved activity in time.

FIGS. 1A and 1B provide one example of the foregoing. As shown, primary resources R1, R2 and R3 are primary resources and SR represents a main secondary resource. Order 1 consists of production activities $A10_1$, $A20_1$, and $A30_1$, and corresponding sequence-dependent setup activities $S10_1$, $S20_1$, and $S30_1$, whose durations depend on a current predecessor activity on their corresponding resources.

Similarly, order 2 consists of production activity $A10_2$ and sequence-dependent setup activity $S10_2$, production activity $A20_2$ and sequence-dependent setup activity $S20_2$, and production activity $A30_2$ and sequence-dependent setup activity $S30_2$. During the activities of each order, SR is occupied by production activity A10 on R1 and setup activities S20 and S30 on resource R2 and R3.

FIG. 1A illustrates a scenario in which secondary capacity requirements of a single secondary resource are consumed by activities placed on different primary resources. Moreover, the vertical lines between the production activities on R1 and R2 and R2 and R3 represent time constraints specifying a minimum distance of 0 seconds and a maximum distance of 1 second.

Upon reviewing the schedule of FIG. 1A, a scheduler may wish to move order 1 somewhat to the right (i.e., later in time), using backward scheduling. The intention of such a move is to close the gap between both orders on secondary resource SR.

More particularly, all activities of order 1 are removed from the board, which causes the sequence-dependent setup activities of order 2 to change in duration. The present example assumes that the durations decrease. $A10_1$ is the first activity to be re-placed and will be moved right to fill the desired slot, as shown in FIG. 1B. This placement changes the duration of $S10_2$. $S10_1$ and $A20_1$ are the next activities to be placed, which causes $S20_2$ to change, so $S20_2$, $A30_2$ and $S30_2$ are removed. $S20_2$ is again placed without overlap, as are $A30_2$ and $S30_2$.

Next, upon placing $A30_1$ as shown, it is recognized that sequence-dependent setup activity $S30_2$ cannot change its duration in response. In other words, the placement of $A30_1$ must cause $S30_2$ to become longer, but such a lengthening would result in the illustrated overlap with $A10_1$. $A30_1$ therefore cannot find a valid slot and an error is issued (e.g., no slot found).

Approaches are desired for efficiently scheduling activities on resources. Such approaches may address issues arising as a result of sequence-dependent setup activities and/or activities belonging to different primary resources and having closely-related finite capacity requirements on a common secondary resource.

BRIEF DESCRIPTION OF THE DRAWINGS

FIGS. 1A and 1B illustrate conventional constraint-based activity scheduling.

FIG. 4 is a representation of activities of an order according to some embodiments.

DETAILED DESCRIPTION

Conventional database systems operate in conjunction with data stored in relational database tables. A data cache may also be provided for storing copies of some or all of the data within instances of object-oriented (e.g., C++) classes. Such instances may be referred to as database objects, and may be stored persistently in main memory (e.g., random access memory) according to some conventional database systems.

Figure 2:
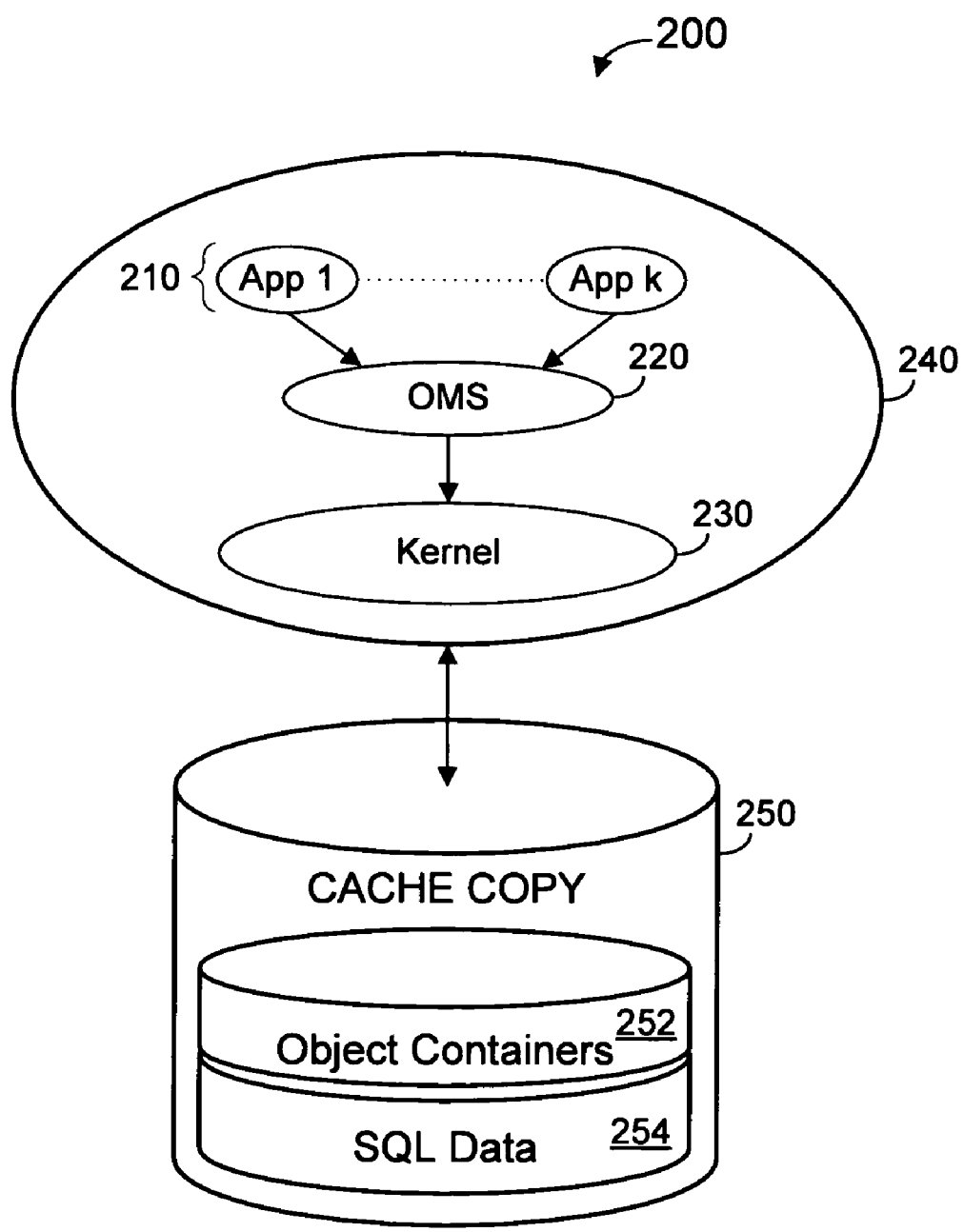
FIG. 2 is a block diagram of an object-oriented database instance according to some embodiments.

An SAP liveCache® database instance may provide a data cache of persistent database objects as described above. Such database objects are managed by an Object Management System (OMS). An OMS may be implemented as an object-oriented library (i.e., liboms) that is linked to the liveCache kernel. FIG. 2 illustrates elements of conventional liveCache database instance 200.

Application logic is written in object-oriented code and built into application libraries 210 against OMS liboms 220 and kernel 230. Libraries 210 contain routines that may be called as database procedures by external workprocesses. The routines provided by application libraries 210 create persistent classes and instances (i.e. persistent database objects) thereof. Application libraries 210, OMS liboms 220, and kernel 230 may comprise "executable" 240 that executes within a common address space.

The above-mentioned persistent database objects are stored in database 250 within class-specific object containers 252. As shown in FIG. 2, database 250 may also store Structured Query Language (SQL) data 254 to be accessed by executable 240.

Executable 240 may comprise any system for managing a database instance that is or becomes known. Generally, executable 240 may receive SQL requests or database procedure calls, may retrieve data from database 250 based on the requests and calls, and may return the data to the requestor. Executable 240 may also perform management, optimization, monitoring and other database-related tasks.

Application libraries 210 may provide scheduling functionality to external workprocesses according to some embodiments. For example, an external workprocess may call a scheduler of libraries 210 to place activity objects on resource objects stored persistently in object containers 252. Such placement may consist of modifying member values of such objects so as to associate the activity with the resource and with a start time, duration, and end time on the resource.

Database instance 200 may be implemented using any suitable software, hardware or firmware that is or becomes known. In some embodiments, database instance 200 resides on a hardware server, with executable 240 comprising program code executed by one or more processors of the hardware server and database 250 residing on a hard disk coupled to the hardware server. Two or more of the elements of instance 200 may be located remote from one another and may communicate with one another via a computer network and/or a dedicated connection.

Figure 3:
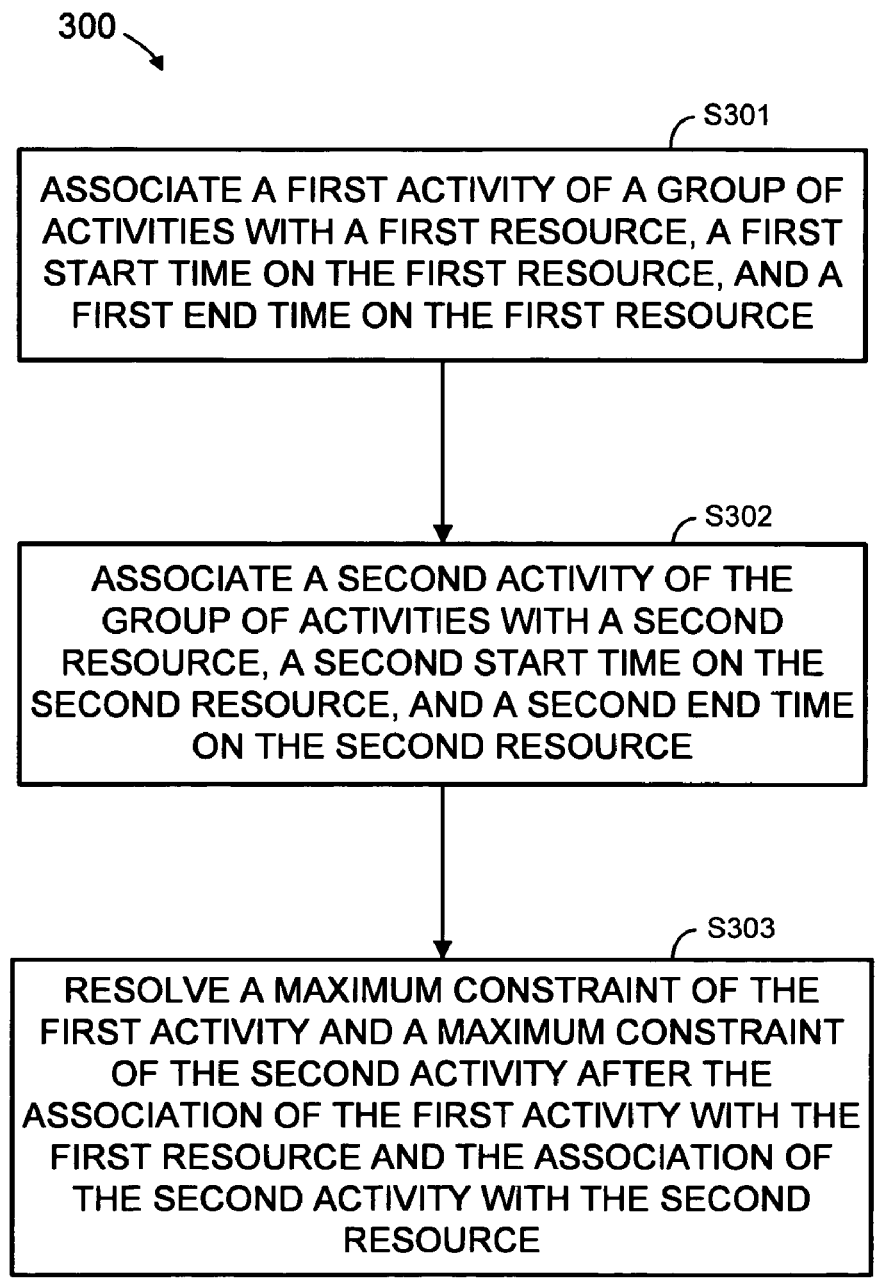
FIG. 3 is a flow diagram of a process to schedule activities according to some embodiments.

FIG. 3 is a flow diagram of process 300 to schedule activities of an order according to some embodiments. Some embodiments of process 300 may be performed by a system such as database instance 200. Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In some specific embodiments, process 300 is embodied in program code of application libraries 210 and performed by database instance 200 in response to execution thereof. Execution of the program code may be initiated by a scheduling-related procedure call received from an external workprocess.

Initially, at S301, a first activity of a group of activities is associated with a first resource, a first-start time on the first resource, and a first end time on the first resource. Any system for associating such data may be used at S301, including but not limited to modifying an object representing the first resource object to indicate the first activity, the first start time and the first end time. The association at S301 may comprise a response to a call specifying a desired resource type, start time and duration.

FIG. 4 represents a group of activities (e.g., an order) that may be scheduled according to some embodiments of process 300. As shown, Order 1 is a group including Activity 1 and Activity 2. Each activity is associated with a minimum start time constraint min_const, a maximum start time constraint max_const, a duration and a resource R_1. R_1 may represent a particular resource or a particular resource type.

FIGS. 5A through 5D are graphical depictions of Activity 1 and Activity 2, the minimum and maximum start time constraints applicable thereto, and their respective placement on resource R_1. Dashed lines indicate an activity that is not placed (i.e., has not been assigned a specific start time and end time) on resource R_1.

Figure 5A:
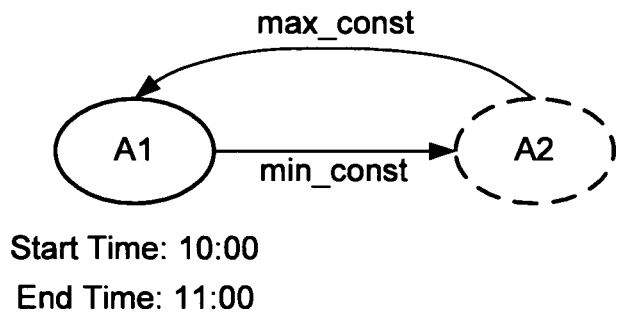
FIGS. 5A to 5D illustrate scheduling of activities according to some embodiments.

FIG. 5A represents Activities 1 and 2 after S301 according to some embodiments. Activity 1 has been placed on resource R_1 and assigned a start time of 10:00 and an end time of 11:00. The start time has been assigned based on the min_const of Activity 1 illustrated in FIG. 4.

Figure 5B:
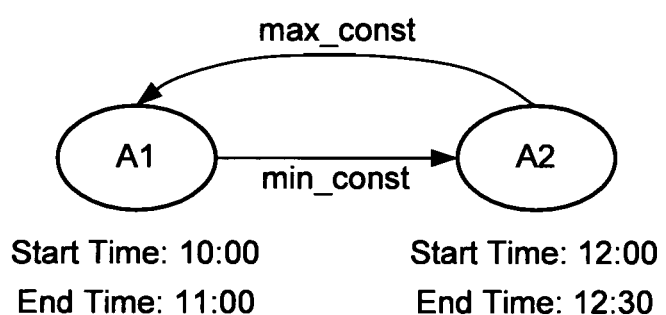

Next, at S302, a second activity of the group of activities is associated with a second resource, a second start time on the second resource, and a second end time on the second resource. FIG. 5B illustrates the placement of Activity 2 on resource R_1 according to some embodiments of S302. Activity may be placed on a resource different from R_1 according to some embodiments. The start time of Activity 2 on resource R_1 is set to 12:00 in order to satisfy the min_const of Activity 2, and the end time (i.e., 12:30) is determined based on the start time and the duration of Activity 2.

The maximum constraints of the first activity and of the second activity are then resolved at S303. Unlike the conventional protocol described in the Background above, this resolution occurs after the association of the first activity with the first resource and the association of the second activity with the first resource.

Figure 5C:
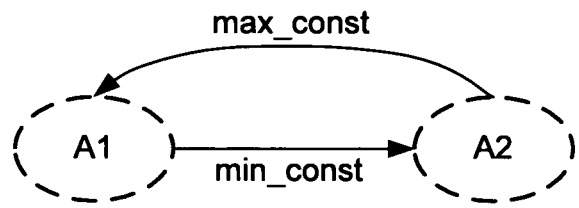
Figure 5D:
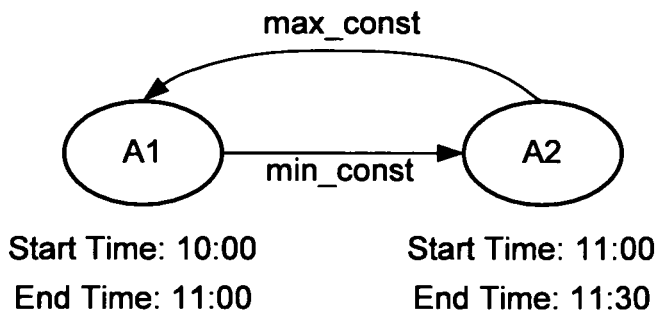

The resolution at S303 may comprise determining that the max_const of Activity 1 is not violated by the schedule represented by FIG. 5B because the start time of Activity 1 is prior to 11:00. However, S303 may comprise determining that the max_const of Activity 2 is violated by the FIG. 5B schedule because the start time of Activity 2 is greater than one second after the end time of Activity 1. In response to such a determination, the first activity may be disassociated from the first resource, and all successor activities of the first activity may be disassociated from their respective resources. FIG. 5C represents the foregoing disassociations in that Activity 1 (i.e., the first activity) and Activity 2 (i.e., all successor activities) are no longer placed on resource R_1.

Resolution at S302 may further include re-placing Activity 1 and Activity 2 on resource R_1 according to S301 and S302. However, the re-placement of Activity 2 during S302 takes the previously-determined violation into account. A schedule such as that shown in FIG. 5D may thereby be generated.

Figure 6:
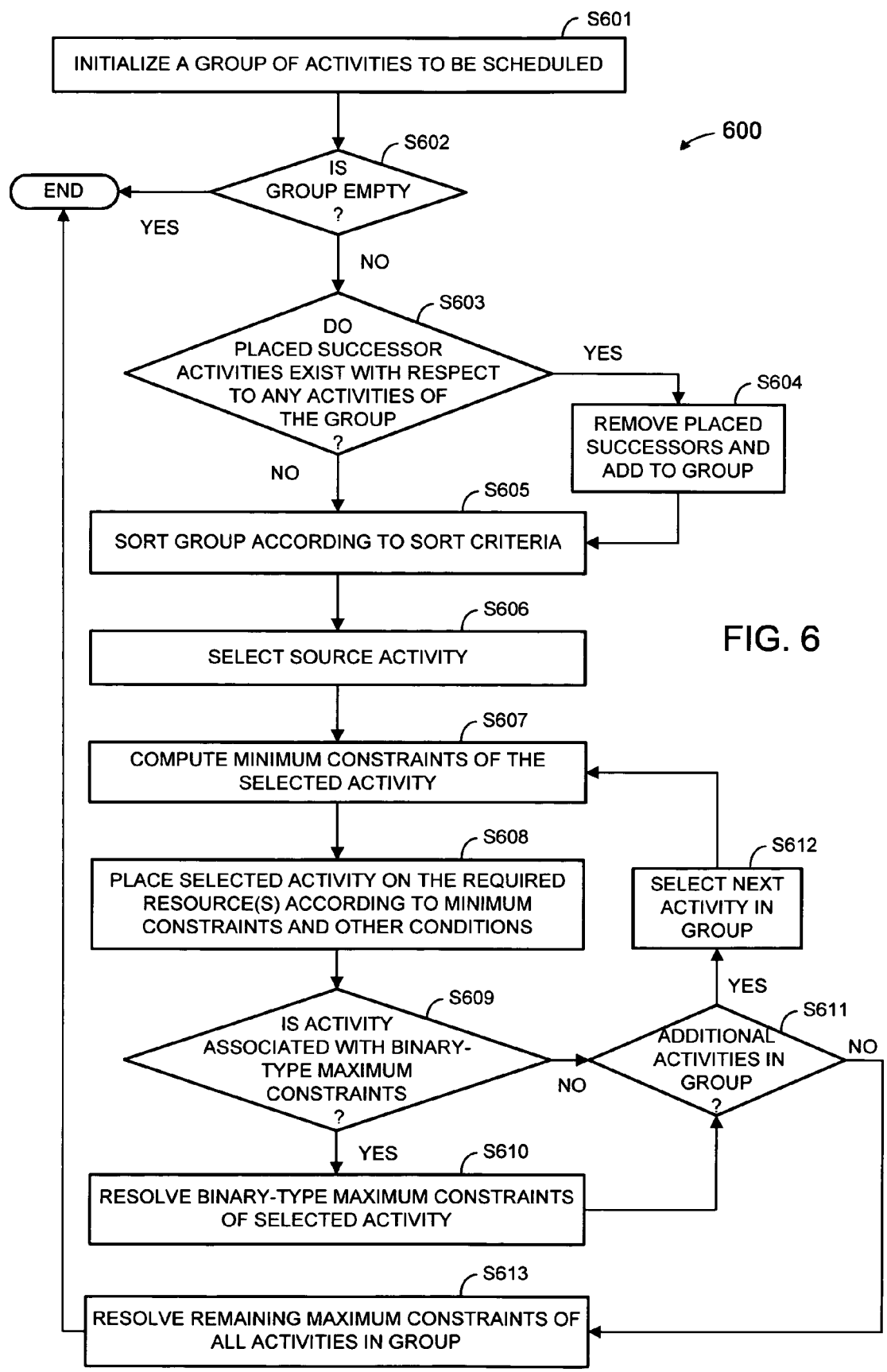
FIG. 6 is a flow diagram of a process to schedule activities according to some embodiments.

FIG. 6 is a flow diagram of process 600 to schedule activities according to some embodiments. Process 600 may be embodied in program code of application libraries 210 and performed by database instance 200 in response to a scheduling-related procedure call received from an external workprocess.

Initially, at S601, a group of activities to be scheduled is initialized. According to some embodiments, the group of activities comprises an order. The group may comprise a subset of an order, a campaign, or any number or type of activities having any type of interrelations in some embodiments.

It is then determined whether the group is empty at S602. If so, process 600 terminates. If not, it is determined at S602 whether any placed successor activities exist with respect to any activities of the group. Placed successor activities comprise any activities that follow any activities of the group and which are placed on a resource as described above. Flow proceeds to S604 if any such placed successor activities exist. The placed successors are removed (i.e., disassociated from their respective resources) and added to the group of activities at S604.

Flow proceeds to S605 from S604 or directly from S603 if no placed successor activities exist. The group of activities is then sorted according to any suitable sorting criteria at S605. According to some embodiments, the activities are sorted at S605 according to a criteria related to their desired order of execution.

Next, at S606, a source activity of the group is selected. The source activity has no predecessor activities among the sorted group of activities. Minimum constraints of the selected activity are computed at S607. The minimum constraints may relate to a start time or any other parameter associated with the activity and having a minimum value that is subject to some restriction.

The selected activity is placed on one or more resources at S608. The activity is placed according to the computed minimum constraints and other conditions such as but not limited to capacity requirements. Placement of the activity at S608 may require re-placement of some already-placed activities according to some embodiments.

After the activity is placed, it is determined at S609 whether the activity is associated with "binary-type" maximum constraints. In some embodiments, a binary-type maximum constraint may comprise a constraint relating only two activities. The max_const of Activity 2 illustrated in FIG. 4 may be considered a binary-type maximum constraint in some embodiments, but might not be considered thusly according to other embodiments. Maximum constraints that interrelate several activities might not be determined as binary-type due to the perceived difficulty in resolving these constraints. Similarly, maximum constraints that relate only two activities might not be considered as binary-type if one or both of the activities is a dynamic sequence-dependent activity and/or the activities are complexly correlated such as two setup activities in sequence and on different resources.

According to some embodiments, binary-type maximum constraints comprise constraints that may be resolved by re-placing one activity, and non-binary-type maximum constraints comprise all other activities. The determination of whether a maximum constraint is a binary-type constraint may be based on a predetermined list of binary-type maximum constraints or a set of criteria that defines binary-type maximum constraints. In some embodiments, a calculation is performed to estimate the complexity that would be required to resolve a maximum constraint, and the maximum constraint is determined to be a binary-type constraint if the complexity is below a given threshold.

Any identified binary-type maximum constraints of the activity are resolved at S610. S303 of process 300 provides one example of resolving a maximum constraint according to some embodiments. Flow continues to S611 from S610 or directly from S609 if it is determined at S609 that the activity is not associated with any binary-type maximum constraints.

At S611, it is determined whether the group includes any additional activities. If so, a next activity in the sorted group is selected at S612 and flow returns to S607. Flow then proceeds through S607, S608, S609 (and possibly S610) with respect to the newly-selected activity as described above. All activities in the group are eventually placed in this manner. In view of the foregoing, these placements satisfy the minimum constraints and the "binary-type" maximum constraints of each of the activities.

Flow proceeds to S613 once it is determined at S611 that no activities in the group remain to be selected and placed. Any remaining unresolved maximum constraints of the group are resolved at S613. These unresolved maximum constraints comprise those maximum constraints that were not determined to be "binary-type" during the execution of S610 associated with each activity of the group.

Resolution of the remaining maximum constraints may comprise any system that is or becomes known to resolve such constraints with respect to placed activities. Such systems may include time-shifting one or more activities, disassociating a subset or all of the activities from their respective resources, and/or consideration of business conditions or knowledge. According to some embodiments, scenarios may exist in which the activities cannot be placed so as to comply with the maximum constraints and the resolution of S613 comprises issuing an error message.

Figure 7:
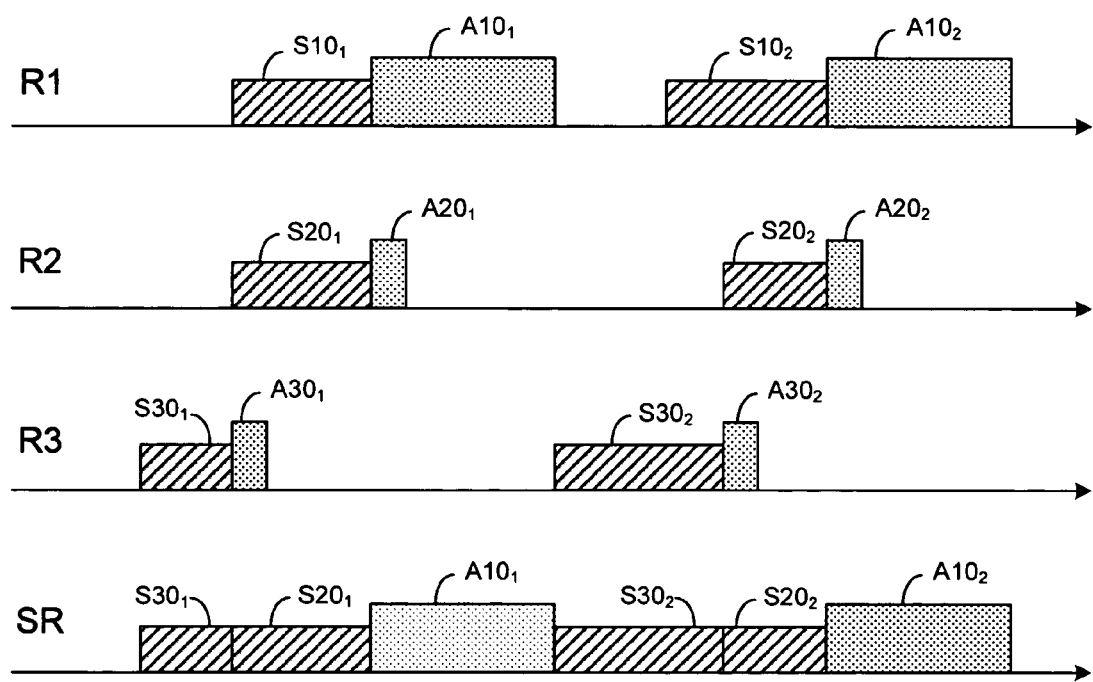
FIG. 7 illustrates scheduling of activities according to some embodiments.

Process 600 terminates after S613. FIG. 7 illustrates a schedule similar to the schedule of FIG. 1B but which has been resolved according to some embodiments of process 600.

Embodiments are not limited to start time-related constraints. For instance, some embodiments may relate to constraints that are specific to tank resources. An order may create output material which is deposited in a tank over a certain time and at a certain rate. Other orders may remove material from the tank, perhaps simultaneously with deposit of material in the tank by another order. The tank is subject to two constraints, a minimum fill level (i.e., something has to be in the tank to take anything out) and a maximum fill level (i.e., the tank cannot be filled over its capacity). According to some embodiments, each order may be placed on the tank resource based on the minimum fill level constraint, and, once a group of orders has been placed, the maximum constraint for each order is evaluated. If a violation of the maximum constraint is detected, the scheduler may determine which orders should be moved and may trigger corresponding actions.

Other embodiments may relate to campaign planning. According to campaign planning, a group consists of all orders which belong to a campaign. The orders of the group must be placed according to a particular temporal sequence, with the first order of the group being placed earlier that all other orders of the campaign, the second order being placed next, and the last order being placed later than all other orders of the campaign. A conventional scheduling algorithm might not be able to place orders between already-placed orders of a campaign due to this temporal constraint. Some embodiments may resolve these issues and may also handle constraints such as minimal campaign size and maximal campaign size, which indicates that a last order inserted after a given number of orders of a campaign would split that campaign.

The embodiments described herein are solely for the purpose of illustration. Those in the art will recognize other embodiments may be practiced with modifications and alterations limited only by the claims.

What is claimed is:
1. A method, comprising:
associating, by a processor, a first activity of a group of activities with a first resource, a first start time on the first resource, and a first end time on the first resource, wherein associating the first activity with the first resource comprises associating the first activity with the first resource based on one or more minimum constraints of the first activity;

associating, by a processor, a second activity of the group of activities with a second resource, a second start time on the second resource, and a second end time on the second resource, wherein the second activity is preceded by the first activity in a desired order of execution and wherein associating the second activity with the second resource comprises associating the second activity with the second resource based on one or more minimum constraints of the second activity;

determining, before the association of the second activity with the second resource, that a first maximum constraint of the first activity should be resolved after the association of the first activity with the first resource and before the association of the second activity with the second resource;

determining, before the association of the second activity with the second resource, that a second maximum constraint of the first activity should be resolved after the association of the first activity with the first resource and the association of the second activity with the second resource;

resolving, by a processor, the first maximum constraint of the first activity after the association of the first activity with the first resource and before the association of the second activity with the second resource;

wherein resolving the first maximum constraint of the first activity after the association of the first activity with the first resource and before the association of the second activity with the second resource comprises:

determining that the first maximum constraint of the first activity is violated after the association of the first activity with the first resource and before the association of the second activity with the second resource;

disassociating the first activity from the first resource after the association of the first activity with the first resource and before the association of the second activity with the second resource; and re-associating the first activity with the first resource after the association of the first activity with the first resource and before the association of the second activity with the second resource; and resolving, by a processor, the second maximum constraint of the first activity and a maximum constraint of the second activity after the association of the first activity with the first resource and the association of the second activity with the second resource.

2. A method according to claim 1, further comprising:

associating, by a processor, a third activity of the group of activities with the first resource, a third start time on the first resource, and a third end time on the first resource;

determining, by a processor, one or more maximum constraints of the third activity;

determining, by a processor, that one of the one or more maximum constraints of the third activity should be resolved before all activities of the group are associated with their respective resources;

determining, by a processor, that another one of the one or more maximum constraints of the third activity should be resolved after all activities of the group are associated with their respective resources;

resolving, by a processor, the one of the one or more maximum constraints of the third activity before all activities of the group are associated with their respective resources; and resolving, by a processor, the other one of the one or more maximum constraints of the third activity after all activities of the group are associated with their respective resources.

3. A method according to claim 1, wherein the first resource and the second resource are the same resource.

4. A method according to claim 1, wherein disassociating the first activity from the first resource comprises:

disassociating the first activity from the first resource in response to determining that the maximum constraint of the second activity is violated.

5. A method according to claim 4, wherein re-associating the first activity with the first resource, the first start time on the first resource, and the first end time on the first resource comprises:

re-associating the first activity with the first resource after the disassociating the first activity from the first resource.

6. A method according to claim 1, wherein resolving the second maximum constraint of the first activity and the maximum constraint of the second activity after the association of the first activity with the first resource and the association of the second activity with the second resource comprises:

determining that the maximum constraint of the second activity is violated;

disassociating the first activity from the first resource; and disassociating all successor activities of the first activity from their respective resources.

7. A method according to claim 6, the method further comprising:

re-associating, by a processor, the first activity with the first resource, the first start time on the first resource, and the first end time on the first resource;

re-associating, by a processor, the second activity with the second resource, a third start time on the second resource, and a third end time on the second resource; and resolving, by a processor, the second maximum constraint of the first activity and the maximum constraint of the second activity after the re-association of the first activity with the first resource and the re-association of the second activity with the second resource.

8. A method according to claim 1, wherein determining that the first maximum constraint of the first activity should be resolved after the association of the first activity with the first resource and before the association of the second activity with the second resource comprises:

determining that the first maximum constraint of the first activity should be resolved after the association of the first activity with the first resource and before the association of the second activity with the second resource if the first maximum constraint is a binary type maximum constraint.

9. A computer-readable medium storing program code executable by one or more processors to result in a method comprising:

associating a first activity of a group of activities with a first resource, a first start time on the first resource, and a first end time on the first resource, wherein associating the first activity with the first resource comprises associating the first activity with the first resource based on one or more minimum constraints of the first activity;

associating a second activity of the group of activities with a second resource, a second start time on the second resource, and a second end time on the second resource, wherein the second activity is preceded by the first activity in a desired order of execution and wherein associating the second activity with the second resource comprises associating the second activity with the second resource based on one or more minimum constraints of the second activity;

determining, before the association of the second activity with the second resource, that a first maximum constraint of the first activity should be resolved after the association of the first activity with the first resource and before the association of the second activity with the second resource;

determining, before the association of the second activity with the second resource, that a second maximum constraint of the first activity should be resolved after the association of the first activity with the first resource and the association of the second activity with the second resource;

resolving the first maximum constraint of the first activity after the association of the first activity with the first resource and before the association of the second activity with the second resource;

wherein resolving the first maximum constraint of the first activity after the association of the first activity with the first resource and before the association of the second activity with the second resource comprises:

determining that the first maximum constraint of the first activity is violated after the association of the first activity with the first resource and before the association of the second activity with the second resource;

disassociating the first activity from the first resource after the association of the first activity with the first resource and before the association of the second activity with the second resource; and re-associating the first activity with the first resource after the association of the first activity with the first resource and before the association of the second activity with the second resource; and resolving the second maximum constraint of the first activity and a maximum constraint of the second activity after the association of the first activity with the first resource and the association of the second activity with the second resource.

10. A medium according to claim 9, the medium further comprising:

associating a third activity of the group of activities with the first resource, a third start time on the first resource, and a third end time on the first resource;

associating one or more maximum constraints of the third activity;

determining that one of the one or more maximum constraints of the third activity should be resolved before all activities of the group are associated with their respective resources;

determining that another one of the one or more maximum constraints of the third activity should be resolved after all activities of the group are associated with their respective resources;

resolving the one of the one or more maximum constraints of the third activity before all activities of the group are associated with their respective resources; and resolving the other one of the one or more maximum constraints of the third activity after all activities of the group are associated with their respective resources.

11. A medium according to claim 9, wherein the first resource and the second resource are the same resource.

12. A medium according to claim 9, wherein resolving the second maximum constraint of the first activity and the maximum constraint of the second activity after the association of the first activity with the first resource and the association of the second activity with the second resource comprises:

determining that the maximum constraint of the second activity is violated;

disassociating the first activity from the first resource; and disassociating all successor activities of the first activity from their respective resources.

13. A medium according to claim 12, the medium further comprising:

re-associating the first activity with the first resource, the first start time on the first resource, and the first end time on the first resource;

re-associating the second activity with the second resource, a third start time on the second resource, and a third end time on the second resource; and resolving the second maximum constraint of the first activity and the maximum constraint of the second activity after the re-association of the first activity with the first resource and the re-association of the second activity with the second resource.

14. A medium according to claim 9, wherein determining that the first maximum constraint of the first activity should be resolved after the association of the first activity with the first resource and before the association of the second activity with the second resource comprises:

determining that the first maximum constraint of the first activity should be resolved after the association of the first activity with the first resource and before the association of the second activity with the second resource if the first maximum constraint is a binary type maximum constraint.

15. A system comprising:

a database of transactional objects stored in main memory, the database comprising activity objects, order objects and resource objects;

one or more processors in communication with the database, the one or more processors to:

associate a first activity of a group of activities with a first resource, a first start time on the first resource, and a first end time on the first resource, wherein association of the first activity with the first resource comprises association of the first activity with the first resource based on one or more minimum constraints of the first activity;

associate a second activity of the group of activities with a second resource, a second start time on the second resource, and a second end time on the second resource, wherein the second activity is preceded by the first activity in a desired order of execution and wherein association of the second activity with the second resource comprises association of the second activity with the second resource based on one or more minimum constraints of the second activity;

determine, before the association of the second activity with the second resource, that a first maximum constraint of the first activity should be resolved after the association of the first activity with the first resource and before the association of the second activity with the second resource;

determine, before the association of the second activity with the second resource, that a second maximum constraint of the first activity should be resolved after the association of the first activity with the first resource and the association of the second activity with the second resource;

resolve the first maximum constraint of the first activity after the association of the first activity with the first resource and before the association of the second activity with the second resource;

wherein resolution of the first maximum constraint of the first activity after the association of the first activity with the first resource and before the association of the second activity with the second resource comprises:

determination that the first maximum constraint of the first activity is violated after the association of the first activity with the first resource and before the association of the second activity with the second resource;

disassociation of the first activity from the first resource after the association of the first activity with the first resource and before the association of the second activity with the second resource; and re-association of the first activity with the first resource after the association of the first activity with the first resource and before the association of the second activity with the second resource; and resolve the second maximum constraint of the first activity and a maximum constraint of the second activity after the association of the first activity with the first resource and the association of the second activity with the second resource.

16. A system according to claim 15, the one or more processors further to:

associate a third activity of the group of activities with the first resource, a third start time on the first resource, and a third end time on the first resource;

determine one or more maximum constraints of the third activity;

determine that one of the one or more maximum constraints of the third activity should be resolved before all activities of the group are associated with their respective resources;

determine that another one of the one or more maximum constraints of the third activity should be resolved after all activities of the group are associated with their respective resources;

resolve the one of the one or more maximum constraints of the third activity before all activities of the group are associated with their respective resources; and resolve the other one of the one or more maximum constraints of the third activity after all activities of the group are associated with their respective resources.

17. A system according to claim 15, wherein the first resource and the second resource are the same resource.

18. A system according to claim 15, wherein resolution of the second maximum constraint of the first activity and the maximum constraint of the second activity after the association of the first activity with the first resource and the association of the second activity with the second resource comprises:

determination that the maximum constraint of the second activity is violated;

disassociation of the first activity from the first resource; and disassociation of all successor activities of the first activity from their respective resources.

19. A system according to claim 18, the database further to:

re-associate the first activity with the first resource, the first start time on the first resource, and the first end time on the first resource;

re-associate the second activity with the second resource, a third start time on the second resource, and a third end time on the second resource; and resolve the second maximum constraint of the first activity and the maximum constraint of the second activity after the re-association of the first activity with the first resource and the re-association of the second activity with the second resource.

20. A system according to claim 15, wherein determination that the first maximum constraint of the first activity should be resolved after the association of the first activity with the first resource and before the association of the second activity with the second resource comprises:

determination that the first maximum constraint of the first activity should be resolved after the association of the first activity with the first resource and before the association of the second activity with the second resource if the first maximum constraint is a binary type maximum constraint.

* * * * *